(12) United States Patent
Kim et al.

(10) Patent No.: US 12,456,569 B2
(45) Date of Patent: Oct. 28, 2025

(54) WIRELESS CHARGING APPARATUS AND MOBILE MEANS COMPRISING SAME

(71) Applicant: SKC CO., LTD., Gyeonggi-do (KR)

(72) Inventors: Tae Kyoung Kim, Gyeonggi-do (KR);
Jong Hak Choi, Gyeonggi-do (KR);
Nah Young Kim, Gyeonggi-do (KR);
Seunghwan Lee, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 882 days.

(21) Appl. No.: 17/764,515

(22) PCT Filed: Oct. 30, 2020

(86) PCT No.: PCT/KR2020/015068
§ 371 (c)(1),
(2) Date: Mar. 28, 2022

(87) PCT Pub. No.: WO2021/086125
PCT Pub. Date: May 6, 2021

(65) Prior Publication Data
US 2022/0351892 A1    Nov. 3, 2022

(30) Foreign Application Priority Data

Oct. 30, 2019  (KR) .................. 10-2019-0136472
Nov. 20, 2019  (KR) .................. 10-2019-0149598
Apr. 28, 2020  (KR) .................. 10-2020-0051252

(51) Int. Cl.
*H01F 27/28*  (2006.01)
*H01F 27/08*  (2006.01)
(Continued)

(52) U.S. Cl.
CPC ........... *H01F 27/255* (2013.01); *H01F 27/08* (2013.01); *H01F 27/28* (2013.01); *H01F 27/36* (2013.01); *H02J 50/10* (2016.02); *B60L 53/12* (2019.02)

(58) Field of Classification Search
CPC ........ H01F 27/255; H01F 27/08; H01F 27/28; H01F 27/36; H01F 1/15333;
(Continued)

(56) References Cited

U.S. PATENT DOCUMENTS 10,090,885 B2    10/2018  Widmer et al.
2009/0021212 A1*  1/2009  Hasegawa ........... H01F 27/2885
                                                          320/108
(Continued)

FOREIGN PATENT DOCUMENTS

CN    107591231 A      1/2018
DE    102017207266 A1  10/2018
(Continued)

OTHER PUBLICATIONS

Office Action for the Chinese Patent Application No. 202080076735.6 issued by the Chinese Patent Office on Nov. 30, 2023.
(Continued)

*Primary Examiner* — Shawki S Ismail
*Assistant Examiner* — Kazi S Hossain
(74) *Attorney, Agent, or Firm* — IP & T GROUP LLP

(57) ABSTRACT

A wireless charging apparatus according to an embodiment may improve both the charging efficiency and the heat dissipation characteristics by use of a three-dimensional structure in a magnetic portion. In detail, the wireless charging efficiency may be increased and heat generated from the magnetic portion may be lowered by increasing the thickness of the magnetic portion near a coil portion, where electromagnetic energy is concentrated during wireless
(Continued)

charging, and by reducing the thickness of the magnetic portion in the center, where the density of the electromagnetic energy is relatively low. Accordingly, the wireless charging apparatus can be efficiently used in a mobile means such as an electric vehicle that requires transmission of a large amount of power between a transmitter and a receiver.

13 Claims, 8 Drawing Sheets

(51) Int. Cl.
    *H01F 27/255*     (2006.01)
    *H01F 27/36*     (2006.01)
    *H02J 50/10*     (2016.01)
    *B60L 53/12*     (2019.01)

(58) Field of Classification Search
CPC .. H01F 1/15375; H01F 1/37; H01F 2003/106; H01F 38/14; H01F 27/22; H01F 27/361; H01F 1/0315; H01F 1/06; H01F 1/20; H01F 1/36; H01F 27/2823; H02J 50/10; H02J 50/005; H02J 50/70; B60L 53/12; B60L 53/302; Y02T 10/70
USPC .......................................... 336/221, 178, 208
See application file for complete search history.

(56) References Cited

U.S. PATENT DOCUMENTS

| | | | | |
|---|---|---|---|---|
| 2009/0267721 | A1* | 10/2009 | Okada | H02J 50/90 336/232 |
| 2012/0319647 | A1* | 12/2012 | Itabashi | H02M 3/33553 320/108 |
| 2013/0093257 | A1* | 4/2013 | Goto | H02J 50/12 307/104 |
| 2014/0111022 | A1 | 4/2014 | Yamakawa | |
| 2017/0178800 | A1* | 6/2017 | Muratov | H01F 27/366 |
| 2018/0286546 | A1 | 10/2018 | Lee et al. | |
| 2020/0198483 | A1 | 6/2020 | Laemmle et al. | |

FOREIGN PATENT DOCUMENTS

| | | |
|---|---|---|
| JP | 2009-027025 A | 2/2009 |
| JP | 2009-267077 A | 11/2009 |
| JP | 2013-017254 A | 1/2013 |
| JP | 2014-220953 A | 11/2014 |
| JP | 2015-103722 A | 6/2015 |
| JP | 2016-537958 A | 12/2016 |
| JP | 2018-536983 A | 12/2018 |
| KR | 10-2011-0042403 A | 4/2011 |
| KR | 10-2014-0067957 A | 6/2014 |
| KR | 10-2016-0100786 A | 8/2016 |
| KR | 10-1971091 B1 | 4/2019 |
| KR | 10-2019-0106082 A | 9/2019 |
| WO | 2013/153736 A1 | 10/2013 |

OTHER PUBLICATIONS

Extended European Search Report for the European Patent Application No. 20881857.5 issued by the European Patent Office on Oct. 31, 2023.

Office Action for the Japanese Patent Application No. 2022-520632 issued by the Japanese Patent Office on Apr. 4, 2023.

* cited by examiner

[Fig. 1]
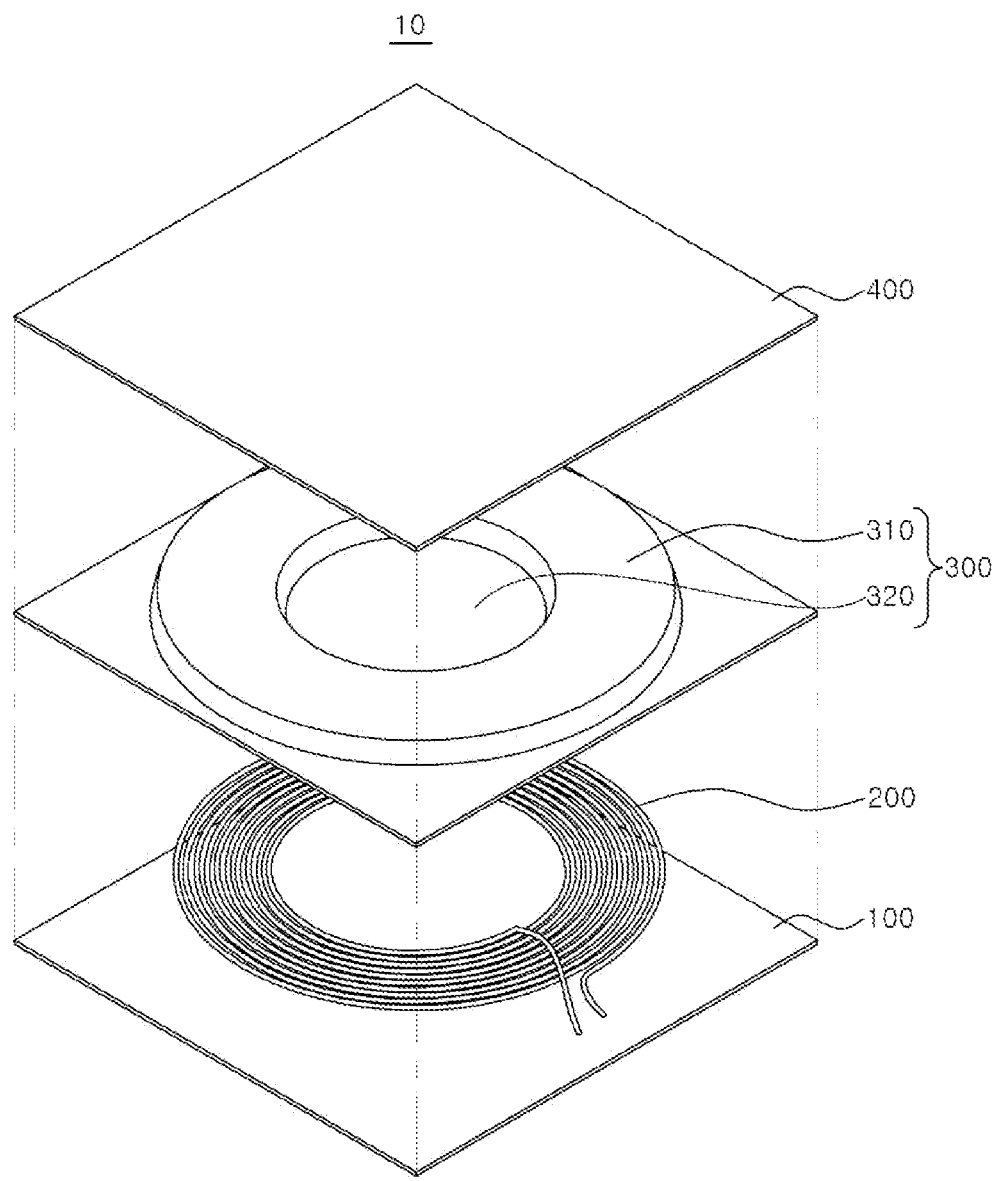

[Fig. 2a]
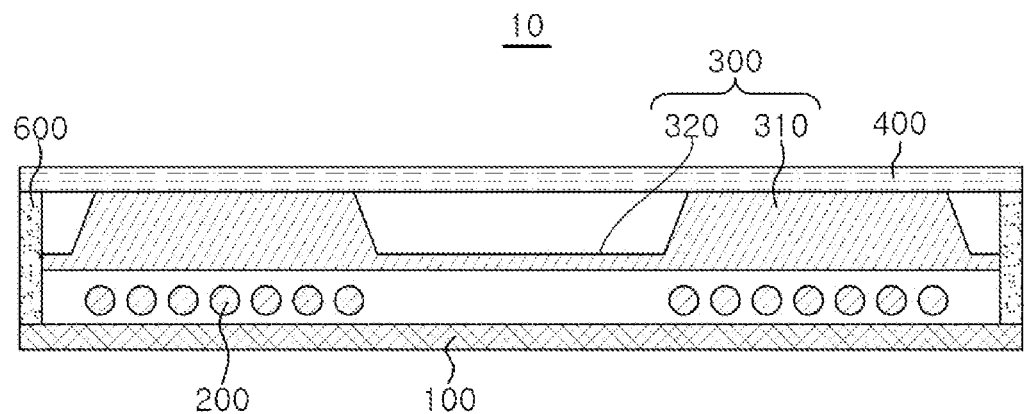
[Fig. 2b]
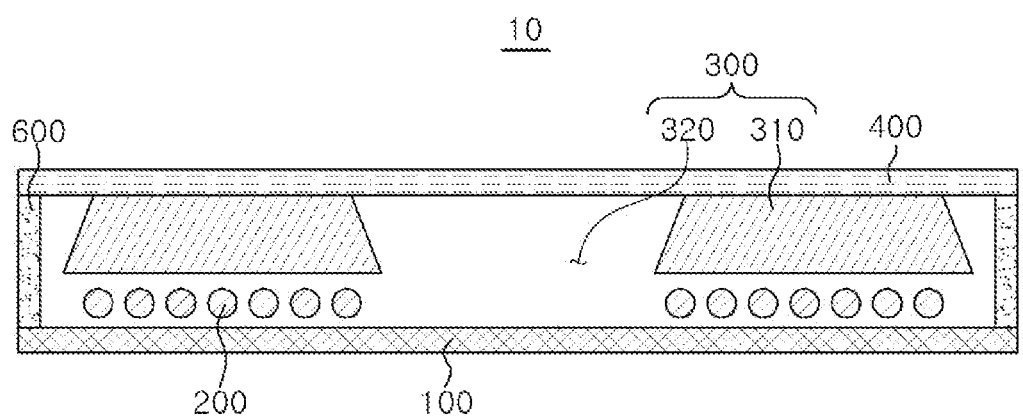
[Fig. 2c]
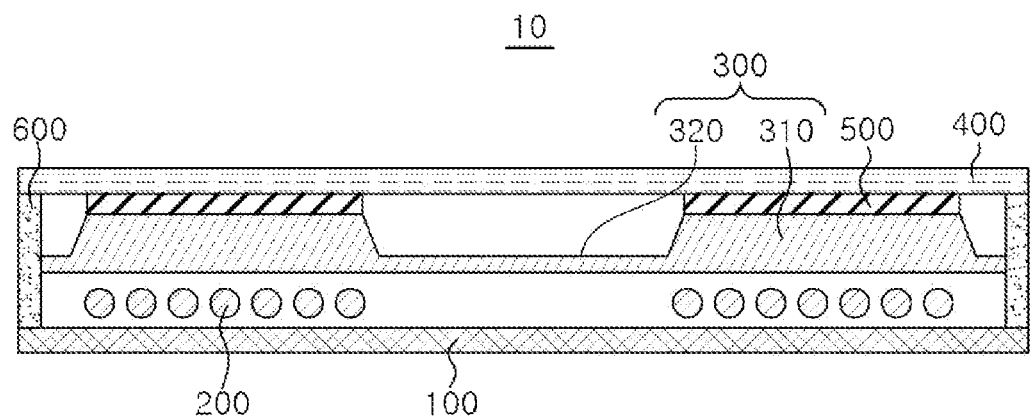

[Fig. 3]
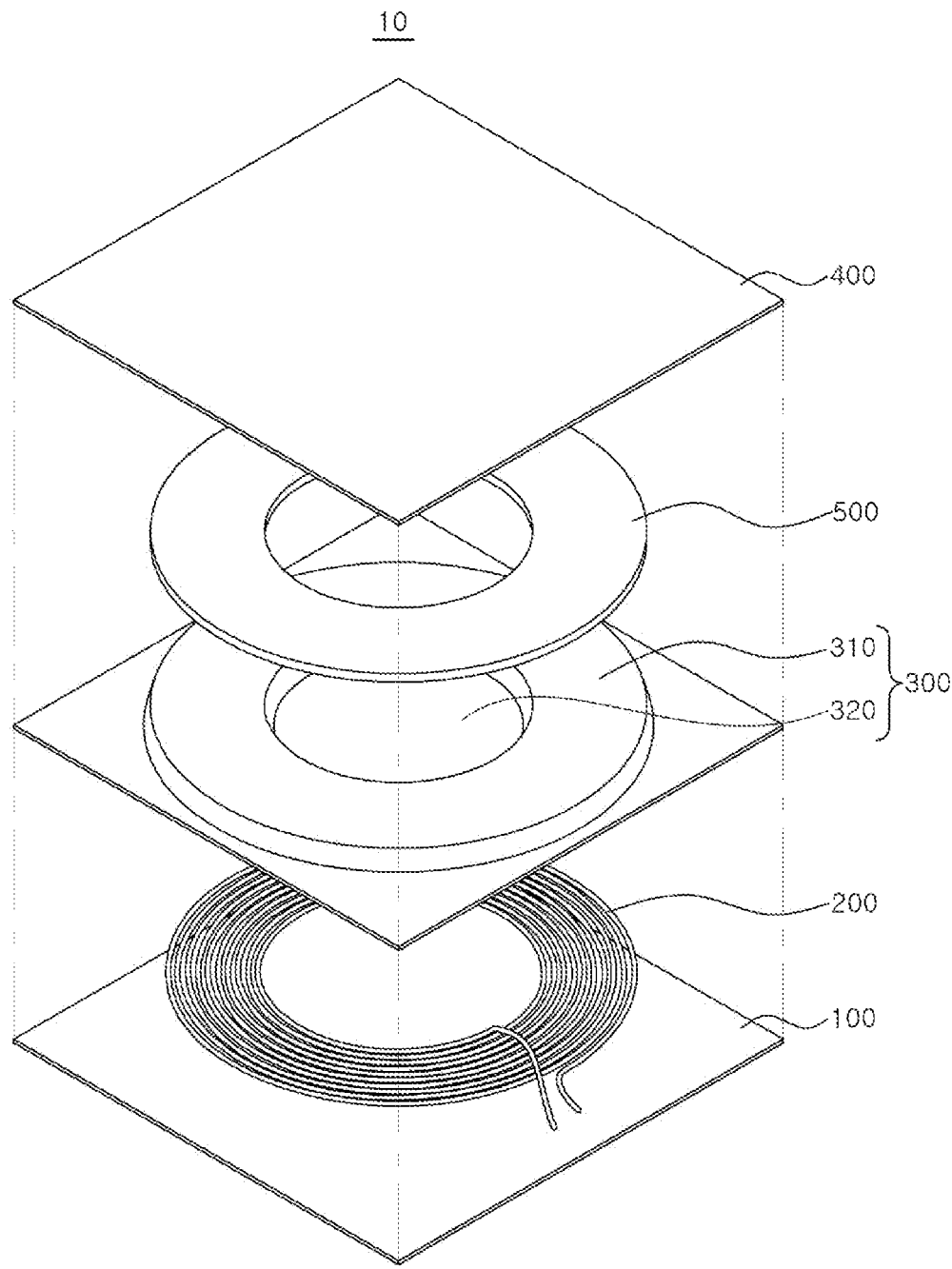

[Fig. 4a]
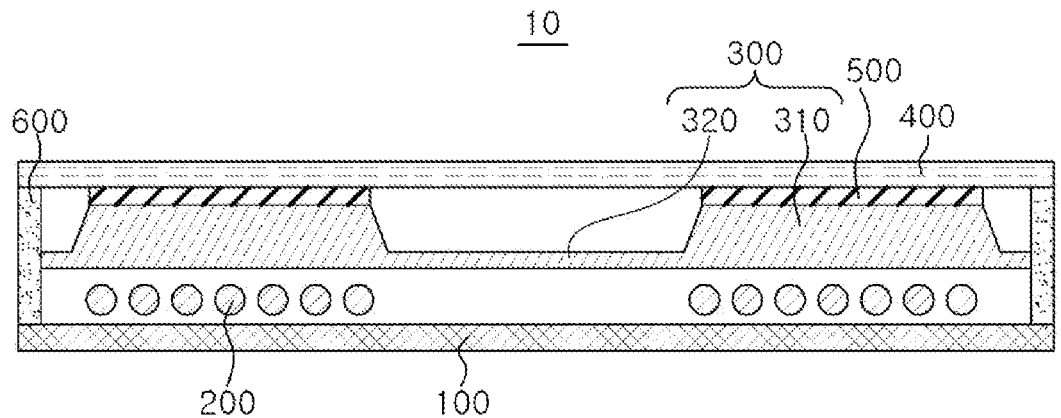
[Fig. 4b]
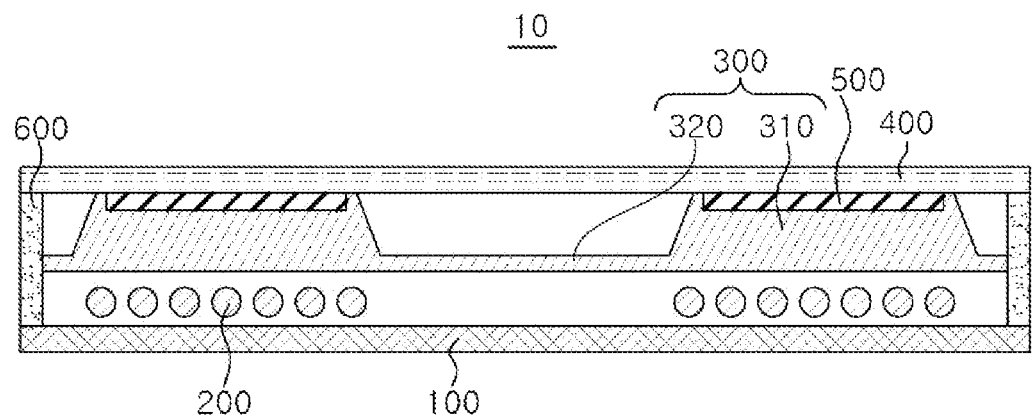
[Fig. 4c]
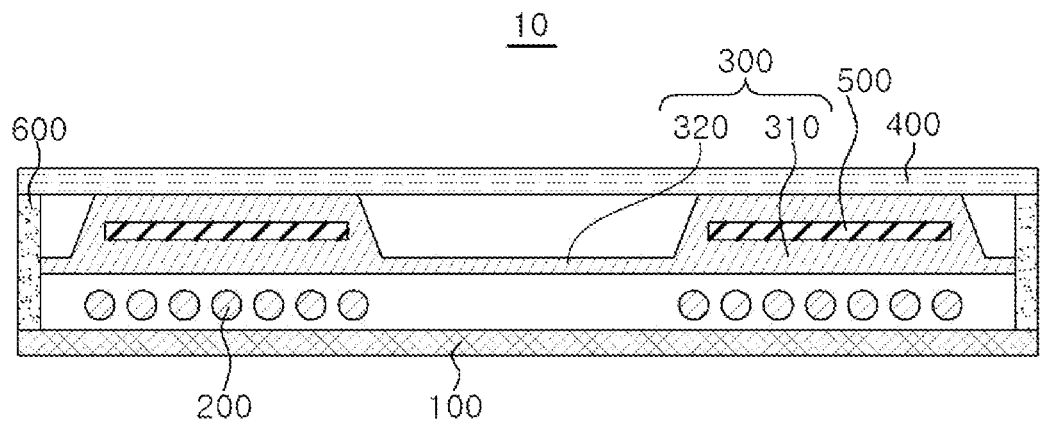

[Fig. 5]
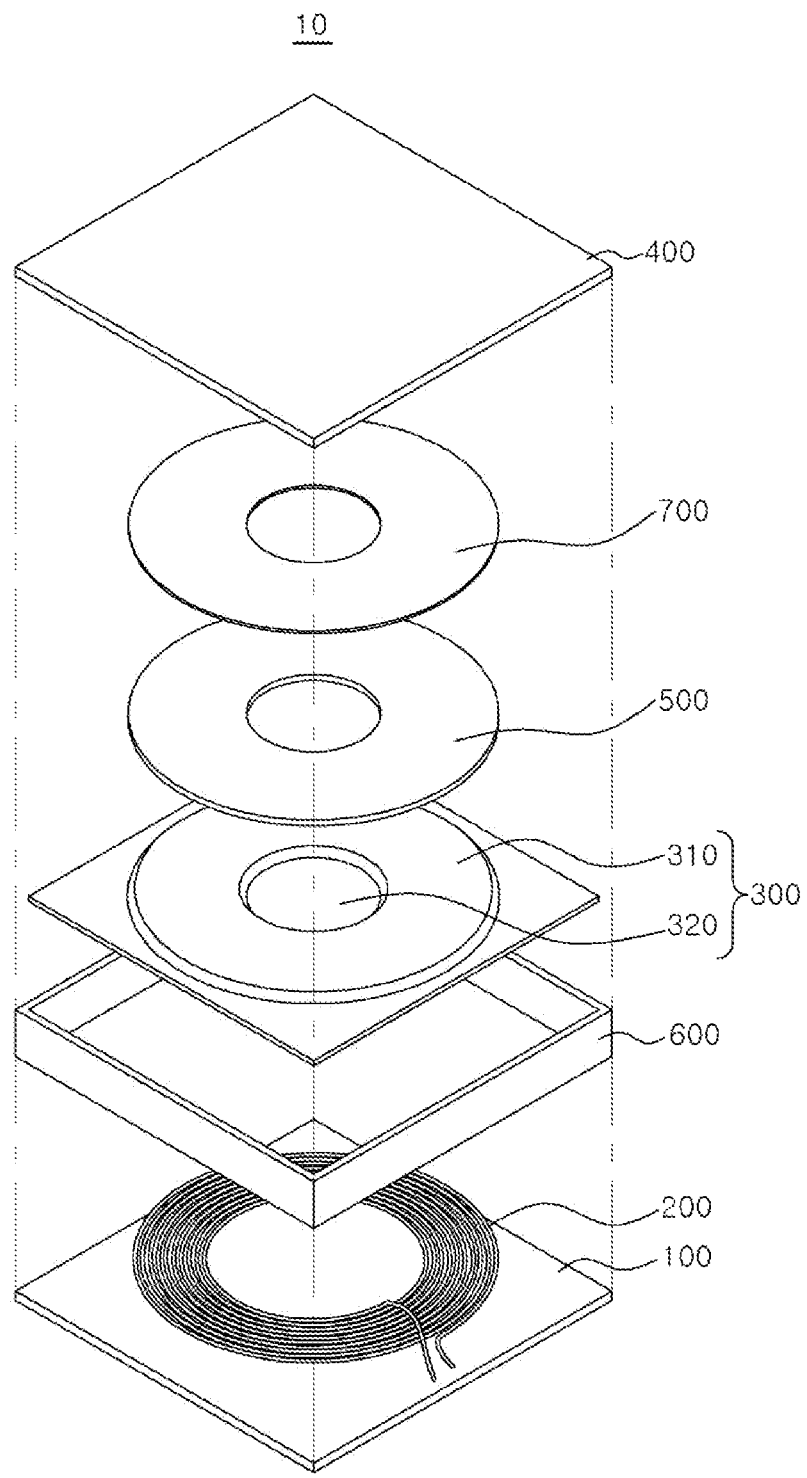

[Fig. 6]
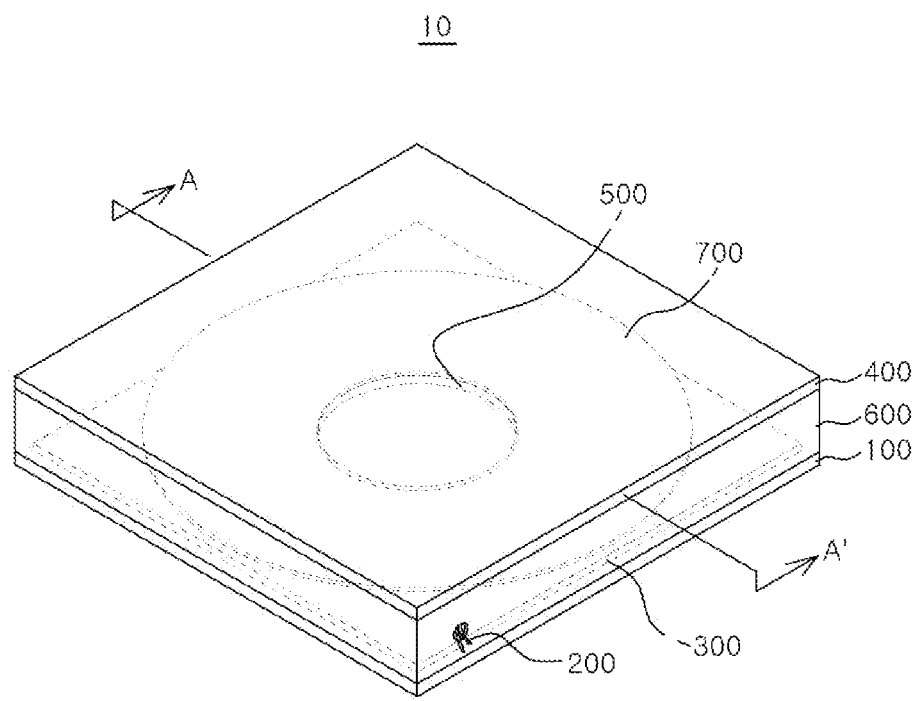
[Fig. 7a]
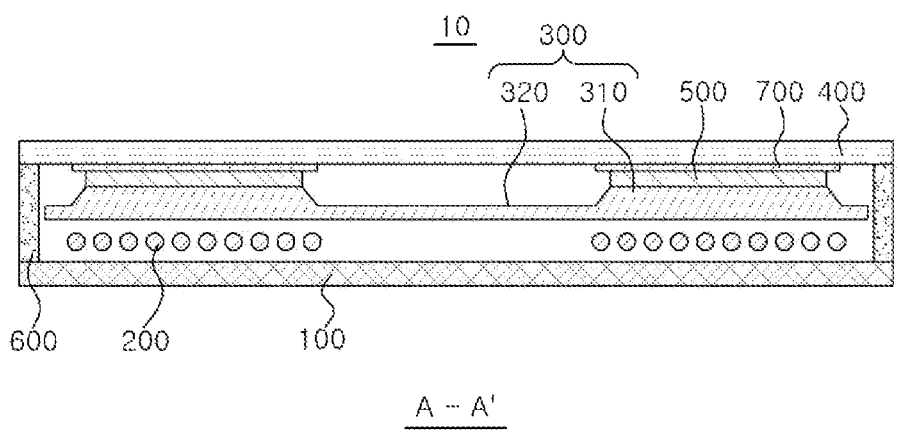
A – A'

[Fig. 7b]
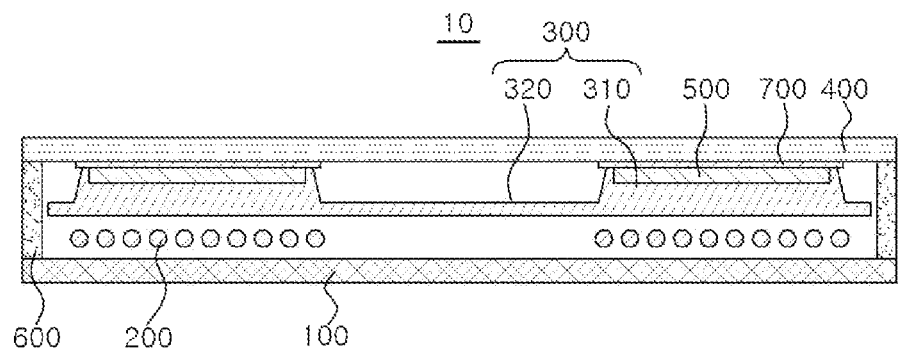
[Fig. 8a]
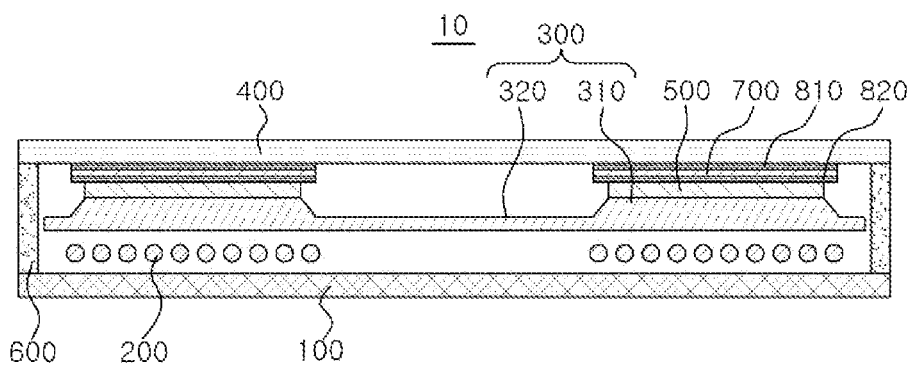
[Fig. 8b]
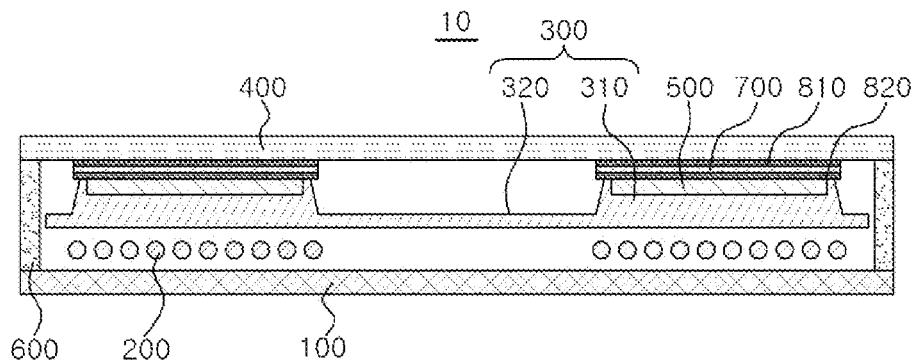

[Fig. 9]
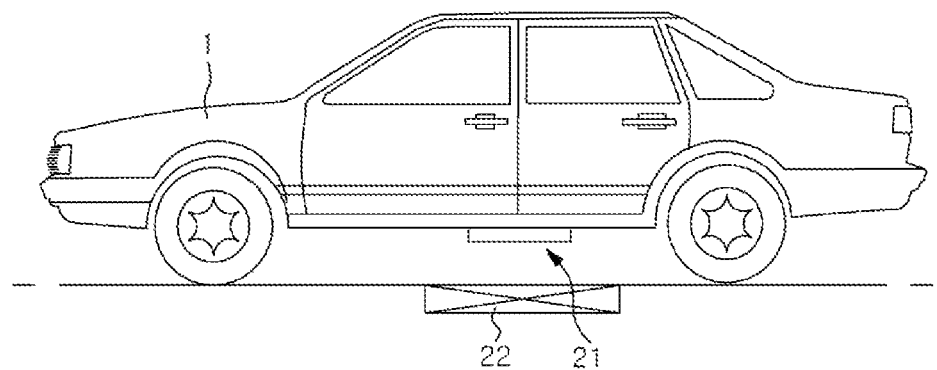

WIRELESS CHARGING APPARATUS AND MOBILE MEANS COMPRISING SAME

This application is a national stage application of PCT/KR2020/015068 filed on Oct. 30, 2020, which claims priority of Korean patent application number 10-2019-0136472 filed on Oct. 30, 2019, Korean patent application number 10-2019-0149598 filed on Nov. 20, 2019, and Korean patent application number 10-2020-0051252 filed on Apr. 28, 2020. The disclosure of each of the foregoing applications is incorporated herein by reference in its entirety.

TECHNICAL FIELD

Embodiments relate to a wireless charging device and a transportation means comprising the same. More specifically, the embodiments relate to a wireless charging device with enhanced charging efficiency through a heat dissipation structure and a transportation means comprising the same such as an electric vehicle.

BACKGROUND ART

In recent years, the information and communication field is being developed at a very fast pace, and various technologies that comprehensively combine electricity, electronics, communication, and semiconductor are continuously being developed. In addition, as electronic devices tend to be more mobile, research on wireless communication and wireless power transmission technologies is being actively conducted in the communication field. In particular, research on a method for wirelessly transmitting power to electronic devices is being actively conducted.

The wireless power transmission refers to wirelessly transmitting power through space using inductive coupling, capacitive coupling, or an electromagnetic field resonance structure such as an antenna without physical contact between a transmitter that supplies power and a receiver that receives power. The wireless power transmission is suitable for portable communication devices, electric vehicles, and the like that require a large-capacity battery. Since the contacts are not exposed, there is little risk of a short circuit, and a charging failure phenomenon in a wired method can be prevented.

Meanwhile, as interest in electric vehicles has rapidly increased in recent years, interest in building charging infrastructure is increasing. Various charging methods have already appeared, such as electric vehicle charging using home chargers, battery replacement, rapid charging devices, and wireless charging devices. A new charging business model has also begun to appear (see Korean Laid-open Patent Publication No. 2011-0042403). In addition, electric vehicles and charging stations that are being tested begin to stand out in Europe. In Japan, electric vehicles and charging stations are being piloted, led by automakers and power companies.

In the conventional wireless charging device used for electric vehicles, a magnetic material is disposed adjacent to the coil to enhance the wireless charging efficiency, and a metal plate for shielding is disposed to be spaced apart from the magnetic material by a predetermined interval.

A wireless charging device generates heat due to the resistance of a coil and the magnetic loss of a magnetic material during the wireless charging operation. In particular, the magnetic material in a wireless charging device generates heat in a part close to the coil with a high electromagnetic wave energy density. The generated heat may change the magnetic characteristics of the magnetic material and cause an impedance mismatch between the transmitter and receiver, which deteriorates the charging efficiency. As a result, the generation of heat is, in turn, aggravated. However, since such a wireless charging device is installed in the lower part of an electric vehicle, a sealed structure is adopted for dustproofing, waterproofing, and shock absorption. Thus, it is difficult to implement a heat dissipation structure.

PRIOR ART DOCUMENT (Patent Document 1) Korean Laid-open Patent Publication No. 2011-0042403

DETAILED DESCRIPTION OF INVENTION

Technical Problem

In the conventional wireless charging devices, a sintered ferrite sheet as a magnetic material is commonly interposed between a coil and a metal plate, especially, on one side close to the coil. However, the sintered ferrite sheet has a heavy specific gravity, and when the distance between the coil and the metal plate becomes close (e.g., 10 mm), there is a problem in that the efficiency steeply decreases. Therefore, a separate structure such as a spacer is required to maintain the distance between the coil and the metal plate and to stably fix the sintered ferrite sheet. As a result, there is a problem in that the cost of the assembly process increases. In addition, heat is generated from the coil and the sintered ferrite sheet during charging. In particular, heat generated from the sintered ferrite sheet is hardly transferred and dissipated to air or spacers having low thermal conductivity characteristics. As a result, the sintered ferrite sheet with an elevated temperature is deteriorated in magnetic properties, which changes the inductance value of the coil, thereby deteriorating the charging efficiency and causing more severe heat generation.

To solve this problem, if a magnetic material that is sufficiently thick to fill the empty space between the coil and the metal plate is adopted, the heat dissipation characteristics can be improved, whereas the high specific gravity of the magnetic material increases the overall weight, which may cause a problem in reducing the weight of a vehicle and significantly increase the manufacturing cost. In addition, a method of filling the empty space between the magnetic material and the metal plate with a heat dissipating material is also being considered. In such a case, the charging efficiency decreases and the manufacturing cost increases due to the electrical conductivity or insulation of the heat dissipating material. If only a part of the empty space between the magnetic material and the metal plate is filled with a heat dissipating material, the heat dissipation performance would not be sufficient.

As a result of research conducted by the present inventors, it has been discovered that if a three-dimensional structure is applied to the magnetic unit adopted in the wireless charging device, the charging efficiency and heat dissipation characteristics can be enhanced.

Accordingly, the problem to be solved by the embodiment is to provide a wireless charging device with improved charging efficiency and heat dissipation characteristics by adopting a magnetic unit having a three-dimensional structure, and a transportation means comprising the same.

Solution to Problem

According to an embodiment, there is provided a wireless charging device, which comprises a coil unit; and a first magnetic unit disposed on the coil unit, wherein the first magnetic unit comprises an outer part corresponding to a part where the coil unit is disposed; and a central part surrounded by the outer part, and the outer part has a thickness greater than the thickness of the central part.

According to another embodiment, there is provided a transportation means, which comprises a wireless charging device, wherein the wireless charging device comprises a coil unit; and a first magnetic unit disposed on the coil unit, the first magnetic unit comprises an outer part corresponding to a part where the coil unit is disposed; and a central part surrounded by the outer part, and the outer part has a thickness greater than the thickness of the central part.

Advantageous Effects of Invention

According to the above embodiments, as a three-dimensional structure is applied to the magnetic unit adopted in the wireless charging device, the charging efficiency and heat dissipation characteristics can be enhanced. Specifically, as the thickness of the magnetic unit near the coil unit where electromagnetic energy is concentrated during wireless charging is increased, and as the thickness of the central magnetic unit having a relatively low electromagnetic energy density is decreased, it is possible to increase the wireless charging efficiency and to reduce the heat generated from the magnetic unit.

In addition, according to a preferred embodiment, as two or three different types of magnetic units are combined, it is possible to effectively disperse the heat generated during wireless charging through the distribution of magnetic flux, whereby the charging efficiency and heat dissipation characteristics can be enhanced together.

Accordingly, the wireless charging device can be advantageously used in a transportation means such as electric vehicles that require large-capacity power transmission between a transmitter and a receiver.

BRIEF DESCRIPTION OF DRAWING

FIG. 1 is an exploded perspective view of a wireless charging device according to an embodiment.

FIGS. 2a to 2c are each a cross-sectional view of a wireless charging device according to various embodiments.

FIG. 3 is an exploded perspective view of a wireless charging device according to still another embodiment.

FIGS. 4a to 4c are each a cross-sectional view of a wireless charging device according to various embodiments.

FIGS. 5, 6, and 7a are each an exploded perspective view, a perspective view, and a cross-sectional view of a wireless charging device according to still another embodiment.

FIGS. 7b to 8b are each a cross-sectional view of a wireless charging device according to still another embodiment.

FIG. 9 shows an electric vehicle provided with a wireless charging device as a receiver.

<Explanation of Reference Numerals>

1: transportation means (electric vehicle)
10: wireless charging device
21: receiver
22: transmitter
100: support unit
200: coil unit
300: first magnetic unit
310: outer part <Explanation of Reference Numerals>

320: central part
400: shield unit
500: second magnetic unit
600: housing
700: third magnetic unit
810, 820: heat dissipation unit

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Wireless Charging Device

The wireless charging device according to an embodiment comprises a coil unit; and a first magnetic unit disposed on the coil unit, wherein the first magnetic unit comprises an outer part corresponding to a part where the coil unit is disposed; and a central part surrounded by the outer part, and the outer part has a thickness greater than the thickness of the central part.

In addition, the wireless charging device may further comprise a shield unit disposed on the first magnetic unit.

Referring to FIG. 1, the wireless charging device (10) according to an embodiment comprises a coil unit (200) comprising a conductive wire; a shield unit (400) disposed on the coil unit (200); and a first magnetic unit disposed between the coil unit (200) and the shield unit (400), wherein the first magnetic unit (300) may comprise an outer part (310) corresponding to a part where the coil unit (200) is disposed and a central part (320) surrounded by the outer part (310), and the outer part (310) may have a thickness greater than the thickness of the central part (320).

According to the above embodiment, as a three-dimensional structure is applied to the magnetic unit adopted in the wireless charging device, the charging efficiency and heat dissipation characteristics can be enhanced. Specifically, as the thickness of the magnetic unit near the coil unit where electromagnetic energy is concentrated during wireless charging is increased, and as the thickness of the central magnetic unit having a relatively low electromagnetic energy density is decreased, it is possible to increase the wireless charging efficiency and to reduce the heat generated from the magnetic unit.

In addition, as two different types of magnetic units are combined, it is possible to effectively disperse the heat generated during wireless charging through the distribution of magnetic flux, whereby the charging efficiency and heat dissipation characteristics can be enhanced.

Referring to FIG. 3, the wireless charging device (10) according to an embodiment comprises a coil unit (200) comprising a conductive wire; a shield unit (400) disposed on the coil unit (200); and a first magnetic unit (300) and a second magnetic unit (500) disposed between the coil unit (200) and the shield unit (400), wherein the first magnetic unit (300) may comprise an outer part (310) corresponding to a part where the coil unit (200) is disposed and a central part (320) surrounded by the outer part (310), the outer part (310) may have a thickness greater than the thickness of the central part (320), and the second magnetic unit (500) may have a magnetic permeability at 85 kHz higher than that of the first magnetic unit (300).

According to the above embodiment, as a three-dimensional structure is applied to the magnetic unit adopted in the wireless charging device, and as two types of magnetic units are provided, the charging efficiency and heat dissipation characteristics can be enhanced together. Specifically, as the second magnetic unit having a higher magnetic permeability than that of the first magnetic unit is adopted, it is possible to effectively distribute the magnetic flux density and heat dissipation, thereby increasing the wireless charging efficiency, and to dissipate the heat generated from the second magnetic unit through the shield unit, thereby enhancing the heat dissipation characteristics.

In addition, as three different types of magnetic materials are combined, it is possible to effectively disperse the heat generated during wireless charging through the distribution of magnetic flux, whereby the charging efficiency and heat dissipation characteristics can be enhanced.

Referring to FIGS. 5, 6, and 7a, the wireless charging device (10) according to an embodiment comprises a coil unit (200); a first magnetic unit (300) disposed on the coil unit (200); a second magnetic unit (500) disposed on the first magnetic unit (300) and having a magnetic permeability different from that of the first magnetic unit (300); and a third magnetic unit (700) disposed on the second magnetic unit (500) and having a magnetic permeability different from that of the second magnetic unit (500).

According to the above embodiment, as three different types of magnetic units are combined, it is possible to effectively disperse the heat generated during wireless charging through the distribution of magnetic flux, whereby the charging efficiency and heat dissipation characteristics can be enhanced together. Specifically, the three types of magnetic units have meaningfully different magnetic properties such as magnetic permeability. If two or more magnetic units are adopted, the magnetic flux density increases in the order of the magnitude of magnetic permeability. Thus, it is possible to distribute the magnetic flux focused during wireless charging in a desired direction by combining them. In addition, heat is generated in a magnitude proportional to the amount of magnetic flux focused on the magnetic unit and magnetic permeability loss during wireless charging. Thus, as the three types of magnetic units are appropriately arranged, heat can be effectively transferred to the shield unit and dissipated to the outside. In addition, as the thicknesses and shapes of the respective magnetic units are adjusted in view of the physical properties and magnetic properties of the three types of magnetic units, it is possible to enhance the impact resistance and to reduce the manufacturing cost without impairing the charging efficiency.

Hereinafter, each constitutional element of the wireless charging device will be described in detail.

Coil Unit

The coil unit may comprise a conductive wire.

The conductive wire comprises a conductive material. For example, the conductive wire may comprise a conductive metal. Specifically, the conductive wire may comprise at least one metal selected from the group consisting of copper, nickel, gold, silver, zinc, and tin.

In addition, the conductive wire may have an insulating sheath. For example, the insulating sheath may comprise an insulating polymer resin. Specifically, the insulating sheath may comprise a polyvinyl chloride (PVC) resin, a polyethylene (PE) resin, a Teflon resin, a silicone resin, a polyurethane resin, or the like.

The conductive wire may have a diameter of, for example, 1 mm to 10 mm, 1 mm to 5 mm, or 1 mm to 3 mm.

The conductive wire may be wound in the form of a planar coil. Specifically, the planar coil may comprise a planar spiral coil. In addition, the planar shape of the coil may be a circle, an ellipse, a polygon, or a polygonal shape with rounded corners, but it is not particularly limited thereto.

The planar coil may have an outer diameter of 5 cm to 100 cm, 10 cm to 50 cm, 10 cm to 30 cm, 20 cm to 80 cm, or 50 cm to 100 cm. As a specific example, the planar coil may have an outer diameter of 10 cm to 50 cm.

In addition, the planar coil may have an inner diameter of 0.5 cm to 30 cm, 1 cm to 20 cm, or 2 cm to 15 cm.

The number of turns of the planar coil may be 5 to 50 times, 10 to 30 times, 5 to 30 times, 15 to 50 times, or 20 to 50 times. As a specific example, the planar coil may be formed by winding the conductive wire 10 to 30 times.

In addition, the distance between the conductive wires in the planar coil shape may be 0.1 cm to 1 cm, 0.1 cm to 0.5 cm, or 0.5 cm to 1 cm.

Within the preferred dimensions and specification ranges of the plane coil as described above, it can be appropriately used in the fields such as electric vehicles that require large-capacity power transmission.

The coil unit may be disposed to be spaced apart from the magnetic unit, for example, the first magnetic unit by a predetermined interval. For example, the spaced distance between the coil unit and the first magnetic unit may be 0.2 mm or more, 0.5 mm or more, 0.2 mm to 3 mm, or 0.5 mm to 1.2 mm.

Shield Unit

The wireless charging device according to an embodiment may further comprise a shield unit disposed on the first magnetic unit. In addition, in the case where the wireless charging device further comprises a second magnetic unit and a third magnetic unit in addition to the first magnetic unit, the shield unit may be disposed thereon.

The shield unit suppresses electromagnetic interference (EMI) that may be generated by leakage of electromagnetic waves to the outside through electromagnetic shielding.

The shield unit may be disposed to be spaced apart from the coil unit by a predetermined interval. For example, the spaced distance between the shield unit and the coil unit may be 10 mm or more or 15 mm or more, specifically, 10 mm to 30 mm or 10 mm to 20 mm.

In addition, the shield unit may be disposed to be spaced apart from the magnetic unit, for example, the first magnetic unit by a predetermined interval. For example, the spaced distance between the shield unit and the first magnetic unit may be 3 mm or more, 5 mm or more, 3 mm to 10 mm, or 4 mm to 7 mm.

The material of the shield unit may be, for example, a metal. Thus, the shield unit be a metal plate, but it is not particularly limited thereto. As a specific example, the material of the shield unit may be aluminum. Other metals or alloy materials having an electromagnetic wave shielding ability may be used.

The shield unit may have a thickness of 0.2 mm to 10 mm, 0.5 mm to 5 mm, or 1 mm to 3 mm. In addition, the shield unit may have an area of 200 cm² or more, 400 cm² or more, or 600 cm² or more.

Alternatively, at least a portion of the first magnetic unit may be in contact with the shield unit. For example, as shown in FIG. 2a, the outer part (310) of the first magnetic unit (300) may be in contact with the shield unit (400). Specifically, at least a portion of the outer part of the first magnetic unit may be in contact with the shield unit. Specifically, one side of the outer part of the first magnetic unit may be in contact with the shield unit. In such a case, the central part of the first magnetic unit may not be in contact with the shield unit.

Composition of the First Magnetic Unit

The first magnetic unit may comprise a magnetic powder and a binder resin.

Specifically, the first magnetic unit may comprise a binder resin and a magnetic powder dispersed in the binder resin.

As a result, since the first magnetic powder is coupled with each other by the binder resin, the magnetic unit may have fewer defects over a large area and less damage caused by an impact.

The magnetic powder may be an oxide-based magnetic powder, a metal-based magnetic powder, or a mixed powder thereof. For example, the oxide-based magnetic powder may be a ferrite-based powder, specifically, a Ni—Zn-based, Mg—Zn-based, or Mn—Zn-based ferrite powder. In addition, the metal-based magnetic powder may be a Fe—Si—Al alloy magnetic powder or a Ni—Fe alloy magnetic powder, more specifically, a sendust powder or a permalloy powder.

As an example, the magnetic powder may have a composition of the following Formula 1.

$$Fe_{1-a-b-c}Si_aX_bY_c \quad \text{[Formula 1]}$$

In the above formula, X is Al, Cr, Ni, Cu, or a combination thereof; Y is Mn, B, Co, Mo, or a combination thereof; $0.01 \leq a \leq 0.2$, $0.01 \leq b \leq 0.1$, and $0 \leq c \leq 0.05$.

In addition, the magnetic powder may be a nanocrystalline magnetic powder. For example, it may be a Fe-based nanocrystalline magnetic powder. Specifically, it may be a Fe—Si—Al-based nanocrystalline magnetic powder, a Fe—Si—Cr-based nanocrystalline magnetic powder, or a Fe—Si—B—Cu—Nb-based nanocrystalline magnetic powder.

The magnetic powder may have an average particle diameter in the range of about 3 nm to 1 mm, about 1 μm to 300 μm, about 1 μm to 50 μm, or about 1 μm to 10 μm.

The first magnetic unit may comprise the magnetic powder in an amount of 10% by weight or more, 50% by weight or more, 70% by weight or more, or 85% by weight or more.

For example, the first magnetic unit may comprise the magnetic powder in an amount of 10% by weight to 99% by weight, 10% by weight to 95% by weight, 50% by weight to 95% by weight, 50% by weight to 92% by weight, 70% by weight to 95% by weight, 80% by weight to 95% by weight, or 80% by weight to 90% by weight.

Examples of the binder resin include a polyimide resin, a polyamide resin, a polycarbonate resin, an acrylonitrile-butadiene-styrene (ABS) resin, a polypropylene resin, a polyethylene resin, a polystyrene resin, a polyphenylene sulfide (PPS) resin, a polyether ether ketone (PEEK) resin, a silicone resin, an acrylic resin, a polyurethane resin, a polyester resin, an isocyanate resin, and an epoxy resin, but it is not limited thereto.

For example, the binder resin may be a curable resin. Specifically, the binder resin may be a photocurable resin and/or a thermosetting resin. In particular, it may be a resin capable of exhibiting adhesiveness upon curing. More specifically, the binder resin may be a resin comprising at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group. Such a functional group or moiety may be, for example, an isocyanate group (—NCO), a hydroxyl group (—OH), or a carboxyl group (—COOH).

The first magnetic unit may comprise the binder resin in an amount of 5% by weight to 40% by weight, 5% by weight to 20% by weight, 5% by weight to 15% by weight, or 7% by weight to 15% by weight.

In addition, the first magnetic unit may comprise, based on the weight thereof, 6% by weight to 12% by weight of a polyurethane-based resin, 0.5% by weight to 2% by weight of an isocyanate-based curing agent, and 0.3% by weight to 1.5% by weight of an epoxy resin, as the binder resin.

Magnetic Properties of the First Magnetic Unit

The first magnetic unit may have magnetic characteristics in a certain range in the vicinity of a standard frequency for wireless charging of an electric vehicle.

The standard frequency for wireless charging of an electric vehicle may be less than 100 kHz, for example, 79 kHz to 90 kHz, specifically, 81 kHz to 90 kHz, more specifically, about 85 kHz. It is a band distinct from the frequency applied to mobile electronic devices such as cell phones.

The magnetic permeability of the first magnetic unit at a frequency of 85 kHz may vary depending on the material. It may be 5 or more, for example, 5 to 150,000 and may specifically be in the range of 5 to 300, 500 to 3,500, or 10,000 to 150,000 depending on the specific material. In addition, the magnetic permeability loss of the first magnetic unit at a frequency of 85 kHz may vary depending on the material. It may be 0 or more, for example, 0 to 50,000 and may specifically be 0 to 1,000, 1 to 100, 100 to 1,000, or 5,000 to 50,000 depending on the specific material.

As a specific example, when the first magnetic unit is a polymer-type magnetic material comprising a magnetic powder and a binder resin, its magnetic permeability may be, for example, 5 to 130, 15 to 80, or 10 to 50, and its magnetic permeability loss may be 0 to 20, 0 to 15, or 0 to 5, at a frequency of 85 kHz.

Physical Properties of the First Magnetic Unit

The first magnetic unit may be elongated at a certain ratio. For example, the elongation of the first magnetic unit may be 0.5% or more. The elongation characteristic is difficult to obtain in a ceramic-based magnetic material to which a polymer is not applied. It may reduce damage even if a large-area magnetic unit is distorted by an impact. Specifically, the elongation of the first magnetic unit may be 0.5% or more, 1% or more, or 2.5% or more. There is no particular limitation to the upper limit of the elongation. However, if the content of the polymer resin is increased to enhance the elongation, such characteristics as inductance of the magnetic unit may be deteriorated. Thus, the elongation is preferably 10% or less.

The first magnetic unit has a small rate of change in characteristics before and after an impact and is significantly superior to those of conventional ferrite magnetic sheets. In the present specification, the rate of change (%) in certain characteristics before and after an impact may be calculated by the following equation.

Rate of change (%) in characteristic=|characteristic value before impact−characteristic value after impact|/characteristic value before impact×100

For example, when the first magnetic unit is subjected to free-falling from a height of 1 m, it may have a rate of change in inductance of less than 5% or 3% or less before and after the impact. More specifically, the rate of change in inductance may be 0% to 3%, 0.001% to 2%, or 0.01% to 1.5%. Within the above range, since the rate of change in inductance before and after an impact is relatively small, the stability of the magnetic unit may be further enhanced.

In addition, when the first magnetic unit is subjected to free-falling from a height of 1 m, it may have a rate of change in Q factor (Ls/Rs) of 0% to 5%, 0.001% to 4%, or 0.01% to 2.5%, before and after the impact. Within the above range, since the change in characteristics before and after an impact is small, the stability and impact resistance of the magnetic unit may be further enhanced.

In addition, when the first magnetic unit is subjected to free-falling from a height of 1 m, it may have a rate of change in resistance of 0% to 2.8%, 0.001% to 1.8%, or 0.1% to 1.0%, before and after the impact. Within the above range, even if it is repeatedly applied in an environment where an actual impact and vibration are applied, the resistance value can be well maintained below a certain level.

In addition, when the first magnetic unit is subjected to free-falling from a height of 1 m, it may have a rate of change in charging efficiency of 0% to 6.8%, 0.001% to 5.8%, or 0.01% to 3.4%, before and after the impact. Within the above range, even if a large-area magnetic unit is repeatedly subjected to an impact or distortion, its characteristics can be more stably maintained.

Three-Dimensional Structure of the First Magnetic Unit

According to the above embodiment, as a three-dimensional structure is applied to the first magnetic unit, the charging efficiency and heat dissipation characteristics can be enhanced. Referring to FIGS. 1 and 2a, the first magnetic unit (300) may comprise an outer part (310) corresponding to a part where the coil unit (200) is disposed; and a central part (320) surrounded by the outer part (310), wherein the outer part (310) may have a thickness greater than the thickness of the central part (320). That is, the outer part of the first magnetic unit may correspond to a part of the coil unit having a high density of a conductive wire. The central part of the first magnetic unit may correspond to a part of the coil unit having a low density of a conductive wire. In such an event, the outer part and the central part in the first magnetic unit may be integrally formed with each other.

As described above, as the thickness of the magnetic unit near the coil where electromagnetic energy is concentrated during wireless charging is increased and as the thickness of the central magnetic unit having a relatively low electromagnetic energy density since no coil is disposed there is decreased, it is possible not only to effectively focus electromagnetic waves focused around the coil, thereby enhancing the charging efficiency, but also to maintain the distance between the coil and the shield unit firmly without a separate spacer, whereby it is possible to reduce the material and process costs due to the use of a spacer and the like.

In the first magnetic unit, the outer part may have a thickness that is thicker than that of the central part by 1.5 times or more. Within the above thickness ratio, it is possible to more effectively focus electromagnetic waves concentrated around the coil to enhance the charging efficiency, and it is also advantageous for heat generation and weight reduction. Specifically, in the first magnetic unit, the thickness ratio of the outer part to the central part may be 2 or more, 3 or more, or 5 or more. In addition, the thickness ratio may be 100 or less, 50 or less, 30 or less, or 10 or less. More specifically, the thickness ratio may be 1.5 to 100, 2 to 50, 3 to 30, or 5 to 10.

The thickness of the outer part of the first magnetic unit may be 1 mm or more, 3 mm or more, or 5 mm or more, and 30 mm or less, 20 mm or less, or 11 mm or less. In addition, the thickness of the central part of the first magnetic unit may be 10 mm or less, 7 mm or less, or 5 mm or less, and 0 mm, 0.1 mm or more, or 1 mm or more. Specifically, the outer part of the first magnetic unit may have a thickness of 5 mm to 11 mm, and the central part thereof may have a thickness of 0 mm to 5 mm.

Referring to FIG. 2b, when the thickness of the central part (320) of the first magnetic unit (300) is 0, the first magnetic unit (300) may have an empty shape in the central part (320) (e.g., a donut shape). In such a case, the first magnetic unit may effectively enhance the charging efficiency even with a smaller area.

Area and Thickness of the First Magnetic Unit

The first magnetic unit may have a large area. Specifically, it may have an area of 200 cm$^2$ or more, 400 cm$^2$ or more, or 600 cm$^2$ or more. In addition, the first magnetic unit may have an area of 10,000 cm$^2$ or less.

The first magnetic unit of a large area may be configured by combining a plurality of unit magnetic materials. In such an event, the area of the individual unit magnetic materials may be 60 cm$^2$ or more, 90 cm$^2$, or 95 cm$^2$ to 900 cm$^2$.

Alternatively, the first magnetic unit may have an empty shape in the center. In such a case, it may have an area of the outer part, that is, an area corresponding to the coil unit.

The first magnetic unit may be a magnetic block prepared by a method such as molding through a mold. For example, the first magnetic unit may be one molded into a three-dimensional structure through a mold. Such a magnetic block may be obtained by mixing a magnetic powder and a binder resin and injecting it into a mold by injection molding to be molded to a three-dimensional structure.

Alternatively, the first magnetic unit may be a laminate of magnetic sheets, for example, a laminate in which 20 or more or 50 or more magnetic sheets are laminated.

Specifically, in the magnetic sheet laminate, one or more magnetic sheets may be further laminated only on the outer part of the first magnetic unit. In such an event, the magnetic sheets each may have a thickness of 80 μm or more or 85 μm to 150 μm. Such a magnetic sheet may be prepared by a conventional sheet-forming process such as mixing a magnetic powder and a binder resin to form a slurry, then molding it into a sheet shape, and curing it.

Magnetic Properties of the Second Magnetic Unit

The wireless charging device according to an embodiment may further comprise a second magnetic unit in addition to the first magnetic unit. As a result, while the charging efficiency of the wireless charging device may be enhanced, the heat dissipation characteristics may be improved as well. Specifically, as shown in FIG. 3, it may further comprise a second magnetic unit (500) disposed on the outer part (310) of the first magnetic unit (300).

Specifically, the wireless charging device further comprises a second magnetic unit disposed between the first magnetic unit and the shield unit, wherein the second magnetic unit may have a magnetic permeability at 85 kHz higher than that of the first magnetic unit.

The second magnetic unit may have magnetic characteristics in a specific range in the vicinity of a standard frequency for wireless charging of an electric vehicle.

For example, the magnetic permeability of the second magnetic unit at a frequency of 85 kHz may vary depending on the material. It may be in the range of 5 to 150,000 and may specifically be in the range of 5 to 300, 500 to 3,500, or 10,000 to 150,000 depending on the specific material. In addition, the magnetic permeability loss of the second magnetic unit at a frequency of 85 kHz may vary depending on the material. It may be in the range of 0 to 50,000 and may specifically be 0 to 1,000, 1 to 100, 100 to 1,000, or 5,000 to 50,000 depending on the specific material.

As a specific example, if the second magnetic unit is a ferrite-based material, it may have a magnetic permeability of 1,000 to 5,000 or 2,000 to 4,000 and a magnetic permeability loss of 0 to 1,000, 0 to 100, or 0 to 50, at a frequency of 85 kHz.

The second magnetic unit may have a magnetic permeability at 85 kHz higher than that of the first magnetic unit. For example, the difference in permeability at 85 kHz between the second magnetic unit and the first magnetic unit may be 100 or more, 500 or more, or 1,000 or more, specifically, 100 to 5,000, 500 to 4,000, or 1,000 to 4,000.

Specifically, the first magnetic unit may have a magnetic permeability of 5 to 300 at a frequency of 85 kHz, and the second magnetic unit may have a magnetic permeability of 1,000 to 5,000 at a frequency of 85 kHz.

Although the magnetic flux density during wireless charging is higher as it is closer to the coil, if the magnetic material is around the coil unit, the magnetic flux is focused on the magnetic material. If one or more magnetic materials are adopted, the magnetic flux density increases in the order of the magnitude of magnetic permeability of the magnetic material. Thus, if the second magnetic unit having a magnetic permeability higher than that of the first magnetic unit is properly arranged, the magnetic flux can be effectively distributed.

In addition, the second magnetic unit may have a horizontal thermal conductivity of 1 W/m·K or more, for example, 1 W/m·K to 30 W/m·K or 10 W/m·K to 20 W/m·K. In addition, the second magnetic unit may have a vertical thermal conductivity of 0.1 W/m·K or more, for example, 0.1 W/m·K to 2 W/m·K or 0.5 W/m·K to 1.5 W/m·K. Specifically, the second magnetic unit may have a horizontal thermal conductivity of 1 W/m·K to 30 W/m·K and a vertical thermal conductivity of 0.1 W/m·K to 2 W/m·K.

Accordingly, heat generated during wireless charging due to a magnetic permeability loss in the second magnetic unit may be discharged through the shield unit adjacent to the second magnetic unit.

Composition and Shape of the Second Magnetic Unit

The second magnetic unit may comprise an oxide-based magnetic material, a metal-based magnetic material, or a composite material thereof.

For example, the oxide-based magnetic material may be a ferrite-based magnetic material. A specific chemical formula thereof may be represented by $MOFe_2O_3$ (wherein M is one or more divalent metal elements such as Mn, Zn, Cu, and Ni). The ferrite-based material is preferably a sintered material from the viewpoint of such magnetic characteristics as magnetic permeability. The ferrite-based sintered material may be prepared in the form of a sheet or a block by mixing raw materials, followed by calcining, pulverizing, mixing with a binder resin, molding, and sintering.

More specifically, the oxide-based magnetic material may be a Ni—Zn-based, Mg—Zn-based, or Mn—Zn-based ferrite. In particular, Mn—Zn-based ferrite may exhibit high magnetic permeability, low magnetic permeability loss, and high saturation magnetic flux density over a temperature range of room temperature to 100° C. or higher at a frequency of 85 kHz.

The Mn—Zn-based ferrite comprises 66% by mole to 70% by mole of $Fe_2O_3$, 10% by mole to 20% by mole of ZnO, 8% by mole to 24% by mole of MnO, and 0.4% by mole to 2% by mole of NiO as main components and may further comprise $SiO_2$, CaO, $Nb_2O_5$, $ZrO_2$, SnO, and the like as additional subcomponents. The Mn—Zn-based ferrite may be prepared in the form of a sheet or a block by mixing the main components at predetermined molar ratios, calcining them in the air at a temperature of 800° C. to 1,100° C. for 1 hour to 3 hours, adding the subcomponents thereto and pulverizing them, mixing them with a binder resin such as polyvinyl alcohol (PVA) in an appropriate amount, press-molding them using a press, and sintering them by raising the temperature to 1,200° C. to 1,300° C. for 2 hours or longer. Thereafter, it is processed using a wire saw or a water jet and cut to a required size, if necessary.

In addition, the metal-based magnetic material may be a Fe—Si—Al alloy magnetic material or a Ni—Fe alloy magnetic material, more specifically, a sendust or a permalloy. In addition, the second magnetic unit may comprise a nanocrystalline magnetic material. For example, it may be a Fe-based nanocrystalline magnetic material. Specifically, it may comprise a Fe—Si—Al-based nanocrystalline magnetic material, a Fe—Si—Cr-based nanocrystalline magnetic material, or a Fe—Si—B—Cu—Nb-based nanocrystalline magnetic material. If the nanocrystalline magnetic material is applied as the second magnetic unit, the longer the distance from the coil unit, the lower the resistance (Rs) even if the inductance (Ls) of the coil is lowered. Thus, the quality factor (Q factor: Ls/Rs) of the coil is increased, which may enhance the charging efficiency and reduce the generation of heat.

The second magnetic unit may comprise a magnetic material different from that of the first magnetic unit. As a specific example, the first magnetic unit may comprise a Fe—Si—Al-based alloy magnetic material, and the second magnetic unit may comprise Mn—Zn-based ferrite. The combination of these materials is advantageous in that the second magnetic unit has a higher magnetic permeability at 85 kHz than that of the first magnetic unit.

The second magnetic unit may have a sheet shape or a block shape.

The second magnetic unit may have a thickness of 0.5 mm to 5 mm, specifically, 0.5 mm to 3 mm, 0.5 mm to 2 mm, or 1 mm to 2 mm. The thickness of the outer part of the first magnetic unit may be larger than the thickness of the second magnetic unit. For example, the thickness of the outer part may be 5 mm to 11 mm, and the thickness of the second magnetic unit may be 0.5 mm to 3 mm.

The second magnetic unit may have the same area as, a different area from, that of the first magnetic unit.

For example, the second magnetic unit may have the same large area as that of the first magnetic unit. Specifically, the second magnetic unit may have an area of 200 $cm^2$ or more, 400 $cm^2$ or more, or 600 $cm^2$ or more. In addition, the second magnetic unit may have an area of 10,000 $cm^2$ or less. In addition, the second magnetic unit of a large area may be configured by combining a plurality of unit magnetic materials. In such an event, the area of the individual unit magnetic materials may be 60 cm² or more, 90 cm², or 95 cm² to 900 cm².

Alternatively, the second magnetic unit may have a smaller area than that of the first magnetic unit. For example, if the second magnetic unit is disposed only on the outer part of the first magnetic unit, the second magnetic unit may have an area corresponding to the area of the outer part. In addition, accordingly, the second magnetic unit may be disposed at a position corresponding to the coil unit and may have an area corresponding to the area of the coil unit. In such a case, the second magnetic unit may effectively enhance the charging efficiency and heat dissipation characteristics even with a smaller area.

Arrangement of the Second Magnetic Unit

The second magnetic unit may be disposed on the outer part, the central part, or at least a portion thereof of the first magnetic unit.

As an example, the second magnetic unit may be disposed on the outer part of the first magnetic unit. As a result, a high magnetic flux density around the coil unit can be effectively dispersed, whereby it is possible to increase the charging efficiency as compared with the case in which the first magnetic unit alone is adopted.

Alternatively, the second magnetic unit may be disposed over at least a portion of the outer part and the central part.

In addition, the second magnetic unit may be disposed to be coupled to, or separated from, the first magnetic unit. As shown in FIG. 4a, the second magnetic unit (500) may be disposed between the shield unit (400) and the first magnetic unit (300). As the second magnetic unit having a higher magnetic permeability than that of the first magnetic unit is disposed close to the shield unit, the high magnetic flux density around the coil can be effectively dispersed, whereby it is possible to not only increase the charging efficiency but also effectively dissipate the heat generation concentrated in the vicinity of the coil of the first magnetic unit as compared with the case in which the first magnetic unit alone is adopted.

In such an event, at least a portion of the second magnetic unit may be in contact with the shield unit. As a result, heat generated in the second magnetic unit may be effectively discharged through the shield unit. For example, when the second magnetic unit is in the form of a sheet, one side thereof in its entirety may be in contact with the shield unit. Specifically, the second magnetic unit may be attached to one side of the shield unit facing the first magnetic unit. The second magnetic unit may be attached to one side of the shield unit with a thermally conductive adhesive, thereby further enhancing the heat dissipation effect. The thermally conductive adhesive may comprise a thermally conductive material such as a metal-based, carbon-based, or ceramic-based adhesive, for example, an adhesive resin in which thermally conductive particles are dispersed.

In such an event, the second magnetic unit may be in contact with the first magnetic unit as well. For example, the second magnetic unit may be attached to the outer part of the first magnetic unit.

Alternatively, the second magnetic unit may be disposed to be spaced apart from the first magnetic unit by a predetermined distance. For example, the spaced distance between the first magnetic unit and the second magnetic unit may be 1 mm or more, 2 mm or more, 1 mm to 10 mm, 2 mm to 7 mm, 3 mm to 5 mm, or 5 mm to 10 mm.

As shown in FIG. 4b, a groove may be provided on the surface of the first magnetic unit (300) facing the shield unit (400), and the second magnetic unit (500) may be inserted into the groove.

In such a case, since the first magnetic unit may serve as a housing of the second magnetic unit, a separate adhesive or structure for fixing the second magnetic unit may not be required. In particular, since the first magnetic unit may be molded into a three-dimensional structure through a mold using a polymer-type magnetic unit using a magnetic powder and a binder resin, a groove for inserting the second magnetic unit may be easily formed.

In such a case, at least a portion of the first magnetic unit and the second magnetic unit may be in contact with the shield unit (400). As a result, heat generated in the first magnetic unit and/or the second magnetic unit may be effectively discharged through the shield unit.

The depth of the groove formed in the first magnetic unit may be the same as, or different from, the thickness (height) of the second magnetic unit. If the depth of the groove and the thickness of the second magnetic unit are the same, the first magnetic unit and the second magnetic unit may be in contact with the shield unit at the same time. Alternatively, if the depth of the groove is smaller than the thickness of the second magnetic unit, only the second magnetic unit may be in contact with the shield unit. On the other hand, if the depth of the groove is larger than the thickness of the second magnetic unit, only the first magnetic unit may be in contact with the shield unit.

As shown in FIG. 4c, the second magnetic unit (500) may be disposed to be embedded in the first magnetic unit (300).

Even in such a case, since the first magnetic unit may serve as a housing of the second magnetic unit, a separate adhesive or structure for fixing the second magnetic unit may not be required. In particular, since the first magnetic unit may be molded into a three-dimensional structure through a mold using a polymer-type magnetic unit using a magnetic powder and a binder resin, a structure for embedding the second magnetic unit may be easily formed.

In such an event, at least a portion of the first magnetic unit may be in contact with the shield unit. As a result, heat generated in the first magnetic unit may be effectively discharged through the shield unit.

Combination of Three Types of Magnetic Units

The wireless charging device according to an embodiment may further comprise a third magnetic unit in addition to the first magnetic unit and the second magnetic unit.

Specifically, the wireless charging device may further comprise a second magnetic unit disposed on the first magnetic unit and having a magnetic permeability different from that of the first magnetic unit; and a third magnetic unit disposed on the second magnetic unit and having a magnetic permeability different from that of the second magnetic unit.

In addition, the first magnetic unit, the second magnetic unit, and the third magnetic unit may be disposed between the coil unit and the shield unit.

As a specific example, the first magnetic unit may comprise a magnetic powder and a binder resin, the second magnetic unit may comprise a ferrite-based magnetic material, and the third magnetic unit may comprise a nanocrystalline magnetic material.

A sintered ferrite sheet primarily used as a magnetic unit in the conventional wireless charging devices has excellent magnetic properties, whereas it has high brittleness, thereby lacking resistance to distortion, and has a heavy weight. In addition, it is prone to be destroyed by a thermal impact due to such defects as pores formed during the sintering process, which forms fragments, thereby causing secondary problems. In order to compensate for the shortcomings of such a sintered ferrite sheet, a polymer-type magnetic material with improved impact resistance in which a magnetic powder is mixed with a binder resin may be adopted. However, if a polymer-type magnetic material alone is used, the magnetic permeability is not high, so that a large amount thereof is required to achieve wireless charging performance above a certain level, making it difficult to downsize the device. In addition, when the magnetic flux is focused only on the polymer-type magnetic material, the polymer component accumulates heat, which continuously raises the temperature over time. Meanwhile, a nanocrystalline magnetic material, in which its permeability is enhanced by high-temperature thermal treatment of such a metal component as a Fe-based alloy, is significantly higher in magnetic permeability than those of the conventional magnetic materials. However, its magnetic permeability loss is large, the heat generation is severe, and the manufacturing cost is rather high. If the three types of magnetic units having different characteristics are combined as described above, it is possible to effectively disperse the heat generated during wireless charging through the distribution of magnetic flux, whereby the charging efficiency and heat dissipation characteristics can be enhanced together.

The three types of magnetic units have meaningful differences in such magnetic properties as magnetic permeability and magnetic permeability loss depending on the components constituting them.

For example, the third magnetic unit may have a magnetic permeability higher than those of the first magnetic unit and the second magnetic unit at 85 kHz, and the second magnetic unit may have a magnetic permeability higher than that of the first magnetic unit at 85 kHz. In addition, the third magnetic unit may have a magnetic permeability loss higher than those of the first magnetic unit and the second magnetic unit at 85 kHz, and the second magnetic unit may have a magnetic permeability loss higher than that of the first magnetic unit at 85 kHz.

For example, the difference in magnetic permeability at 85 kHz between the second magnetic unit and the first magnetic unit may be 100 or more, 500 or more, or 1,000 or more, specifically, 100 to 5,000, 500 to 4,000, or 1,000 to 3,000. In addition, the difference in magnetic permeability at 85 kHz between the third magnetic unit and the second magnetic unit may be 1,000 or more, 5,000 or more, or 10,000 or more, specifically, 1,000 to 50,000, 5,000 to 100,000, or 10,000 to 150,000.

As a specific example, the first magnetic unit may have a magnetic permeability of 5 to 300 and a magnetic permeability loss of 0 to 30 at 85 kHz, the second magnetic unit may have a magnetic permeability of 1,000 to 5,000 and a magnetic permeability loss of 0 to 300 at 85 kHz, and the third magnetic unit may have a magnetic permeability of 10,000 to 150,000 and a magnetic permeability loss of 1,000 to 10,000 at 85 kHz.

In addition, since heat is generated during wireless charging in a magnitude proportional to the amount of magnetic flux focused on the magnetic unit and magnetic permeability loss, the three types of magnetic units also have a meaningful difference in the amount of heat generated during wireless charging. For example, during wireless charging, specifically, when the coil unit receives wireless power from the outside, the amount of heat generated in the third magnetic unit may be greater than the amount of heat generated in the first magnetic unit and that in the second magnetic unit.

As a specific example, when the coil unit receives wireless power from the outside, the amount of heat generated in the third magnetic unit may be greater than the amount of heat generated in the second magnetic unit, and the amount of heat generated in the second magnetic unit may be greater than the amount of heat generated in the first magnetic unit.

Since the three types of magnetic units have different magnetic properties and amount of heat generation as described above, the magnetic flux density that is focused during wireless charging can be distributed in a desired direction by using the tendency of the magnetic flux density to increase in the order of the magnitude of magnetic permeability depending on a method of arranging and combining them. In addition, it is possible to effectively dissipate heat to the outside by using the tendency of the amount of heat generation to increase in proportion to the amount of magnetic flux and the size of magnetic permeability loss.

Referring to FIGS. 7a and 7b, the first magnetic unit (300), among the first magnetic unit (300), the second magnetic unit (500), and the third magnetic unit (700), is disposed closest to the coil unit (200), and the third magnetic unit (700) is disposed closest to the shield unit (400). In such an event, the second magnetic unit may be thermally connected to the shield unit. As a result, the large amount of heat generated in the second magnetic unit may be readily discharged through the shield unit to the outside.

In addition, as the amounts of the respective magnetic units are adjusted in view of the physical properties and magnetic properties of the three types of magnetic units, it is possible to enhance the impact resistance and to reduce the manufacturing cost without impairing the charging efficiency. For example, the first magnetic unit may have a larger volume than that of the second magnetic unit, and the second magnetic unit may have a larger volume than that of the third magnetic unit.

The second magnetic unit may comprise a ferrite-based magnetic material, and the specific components and manufacturing method thereof are as exemplified above.

The second magnetic unit may have a sheet shape or a block shape.

The second magnetic unit may have a thickness of 0.5 mm to 5 mm, specifically, 0.5 mm to 3 mm, 0.5 mm to 2 mm, or 1 mm to 2 mm.

The second magnetic unit may have the same area as, a different area from, that of the first magnetic unit.

For example, the second magnetic unit may have the same large area as that of the first magnetic unit. Specifically, the second magnetic unit may have an area of 200 cm$^2$ or more, 400 cm$^2$ or more, or 600 cm$^2$ or more. In addition, the second magnetic unit may have an area of 10,000 cm$^2$ or less. In addition, the second magnetic unit of a large area may be configured by combining a plurality of unit magnetic materials. In such an event, the area of the individual unit magnetic materials may be 60 cm$^2$ or more, 90 cm$^2$, or 95 cm$^2$ to 900 cm$^2$.

Alternatively, the second magnetic unit may have a smaller area than that of the first magnetic unit. For example, if the second magnetic unit is disposed only on the outer part of the first magnetic unit, the second magnetic unit may have an area corresponding to the area of the outer part. In addition, as a result, the second magnetic unit may be disposed at a position corresponding to the coil unit and may have an area corresponding to the area of the coil unit. In such a case, the second magnetic unit may effectively enhance the charging efficiency and heat dissipation characteristics even with a smaller area.

The second magnetic unit may have magnetic characteristics in a specific range in the vicinity of a standard frequency for wireless charging of an electric vehicle. For example, the second magnetic unit may have a magnetic permeability of 1,000 to 5,000 or 2,000 to 4,000 and a magnetic permeability loss of 0 to 1,000, 0 to 100, or 0 to 50, at a frequency of 85 kHz.

The third magnetic unit may comprise a nanocrystalline magnetic material. If the nanocrystalline magnetic material is applied as the third magnetic unit, the longer the distance from the coil unit, the lower the resistance (Rs) even if the inductance (Ls) of the coil is lowered. Thus, the quality factor (Q factor: Ls/Rs) of the coil is increased, which may enhance the charging efficiency and reduce the generation of heat.

For example, the third magnetic unit may be a Fe-based nanocrystalline magnetic material. Specifically, it may be a Fe—Si—Al-based nanocrystalline magnetic material, a Fe—Si—Cr-based nanocrystalline magnetic material, or a Fe—Si—B—Cu—Nb-based nanocrystalline magnetic material.

More specifically, the third magnetic unit may be a Fe—Si—B—Cu—Nb-based nanocrystalline magnetic material. In such a case, it is preferable that Fe is 70% by element to 85% by element, the sum of Si and B is 10% by element to 29% by element, and the sum of Cu and Nb is 1% by element to 5% by element (wherein % by element refers to the percentage of the number of specific elements to the total number of elements constituting the magnetic unit). Within the above composition ranges, a Fe—Si—B—Cu—Nb-based alloy can be easily formed into a nanocrystalline magnetic material by thermal treatment.

The nanocrystalline magnetic material is prepared by, for example, a rapid solidification process (RSP) by melt-spinning a Fe-based alloy. It may be prepared by performing a zero-field thermal treatment for 30 minutes to 2 hours in a temperature range of 300° C. to 700° C.

If the thermal treatment temperature is lower than 300° C., nanocrystals are not sufficiently formed, so that the desired magnetic permeability is not obtained, which requires a longer thermal treatment time. If it exceeds 700° C., the magnetic permeability may be significantly lowered by excessive thermal treatment. In addition, when the thermal treatment temperature is low, the treatment time is long. On the other hand, when the thermal treatment temperature is high, the treatment time is preferably shortened.

The third magnetic material may have a thickness of 15 μm to 150 μm. Meanwhile, it is difficult to make the nanocrystalline magnetic material thick due to the features of the preparation process. For example, it may be formed to a thin sheet having a thickness of 15 μm to 35 μm. Thus, a plurality of such thin film sheets may be laminated to form a third magnetic unit. In such an event, an adhesive layer such as an adhesive tape may be interposed between the thin sheets. In addition, the third magnetic unit may be crushed by a pressure roll or the like at the end of the manufacturing process to form a plurality of cracks in the thin sheet, whereby it may be manufactured to comprise a plurality of nanocrystalline fine pieces.

In addition, as the outer part of the first magnetic unit is formed to have a thickness different from the thicknesses of the second magnetic unit and the third magnetic unit, it is possible to enhance the impact resistance and to reduce the manufacturing cost without impairing the charging efficiency. For example, the outer part of the first magnetic unit may have a thickness greater than those of the second magnetic unit and the third magnetic unit, and the second magnetic unit may have a thickness greater than that of the third magnetic unit. As a specific example, the thickness of the outer part of the first magnetic unit may be 5 mm to 11 mm, the thickness of the second magnetic unit may be 0.5 mm to 3 mm, and the thickness of the third magnetic unit may be 15 μm to 150 μm.

The third magnetic unit may have magnetic characteristics in a specific range in the vicinity of a standard frequency for wireless charging of an electric vehicle. For example, the third magnetic unit may have a magnetic permeability of 500 to 150,000 and a magnetic permeability loss of 100 to 50,000 at a frequency of 85 kHz. As an example, when the third magnetic unit comprises a crushed nanocrystalline magnetic material, it may have a magnetic permeability of 500 to 3,000 and a magnetic permeability loss of 100 to 1,000 at a frequency of 85 kHz. As another example, when the third magnetic unit comprises a non-crushed nanocrystalline magnetic material, it may have a magnetic permeability of 10,000 to 150,000 and a magnetic permeability loss of 1,000 to 10,000 at a frequency of 85 kHz.

Heat Dissipation Unit

The wireless charging device according to an embodiment may further comprise a heat dissipation unit for effective heat transfer.

A lot of heat is generated in the magnetic unit during wireless charging in proportion to the amount of the focused magnetic flux and the magnetic permeability loss. The heat dissipation unit can effectively transfer the heat generated in the magnetic unit to the outside.

The heat dissipation unit may have a sheet shape. That is, the heat dissipation unit may be a heat dissipation sheet.

The heat dissipation unit may comprise a binder resin and a heat dissipation filler dispersed in the binder resin.

As described above, since the heat dissipation unit comprises a polymer component, it may provide adhesive force between the shield unit and the magnetic sheet. In addition, it may prevent the magnetic unit from being damaged by an external impact.

Examples of the binder resin include a polyimide resin, a polyamide resin, a polycarbonate resin, an acrylonitrile-butadiene-styrene (ABS) resin, a polypropylene resin, a polyethylene resin, a polystyrene resin, a polyphenylene sulfide (PPS) resin, a polyether ether ketone (PEEK) resin, a silicone resin, an acrylic resin, a polyurethane resin, a polyester resin, an isocyanate resin, and an epoxy resin, but it is not limited thereto.

For example, the binder resin may be a curable resin. Specifically, the binder resin may be a photocurable resin and/or a thermosetting resin. In particular, it may be a resin capable of exhibiting adhesiveness upon curing. More specifically, the binder resin may be a resin comprising at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group. Such a functional group or moiety may be, for example, an isocyanate group (—NCO), a hydroxyl group (—OH), or a carboxyl group (—COOH).

As a specific example, the binder resin may be one or more types of silicone-based resins and acrylic-based resins.

In addition, the heat dissipation filler may be one or more of ceramic particles, carbon particles, and metal particles. The ceramic particles may comprise an oxide or nitride of a metal. Specifically, they may comprise silica, alumina, boron nitride, aluminum nitride, magnesium oxide, and the like. The carbon particles may comprise graphite, carbon black, carbon nanotubes, and the like. The metal particles may comprise copper, silver, iron, nickel, and the like.

The content of the heat dissipation filler in the heat dissipation unit may be 70% by weight to 90% by weight, 70% by weight to 85% by weight, or 75% by weight to 90% by weight.

The heat dissipation unit may have a thermal conductivity of 0.5 W/m·K to 30 W/m·K, specifically, 2 W/m·K to 5 W/m·K.

The heat dissipation unit may have a thickness of 0.1 mm to 5 mm, specifically, 0.1 mm to 3 mm or 0.2 mm to 1 mm.

The heat dissipation unit may have the same area as, a different area from, that of the first magnetic unit, the second magnetic unit, or the third magnetic unit. For example, if the heat dissipation unit is disposed on the outer part of the first magnetic unit, the heat dissipation unit may have an area corresponding to the area of the outer part. In addition, if the heat dissipation unit is disposed between the third magnetic unit and the shield unit, the heat dissipation unit may have an area corresponding to the area of the third magnetic unit. As a result, the heat dissipation unit may have excellent heat dissipation characteristics, adhesion, and impact resistance even with a small area.

Arrangement of the Magnetic Unit and the Heat Dissipation Unit

The heat dissipation unit may be disposed between the third magnetic unit and the shield unit.

The heat dissipation unit may serve as a thermally conductive medium for more is effective heat transfer between the third magnetic unit and the shield unit. Specifically, the third magnetic unit may be thermally connected to the shield unit via the heat dissipation unit.

For this, the heat dissipation unit may be in contact with the third magnetic unit and the shield unit at the same time. More specifically, the heat dissipation unit may adhere the third magnetic unit and the shield unit. As a result, heat generated in the third magnetic unit may be transferred to the shield unit through the heat dissipation unit to be readily discharged to the outside.

In addition, the third magnetic unit may be in contact with the second magnetic unit, and the second magnetic unit may be in contact with the first magnetic unit. In such an event, the first magnetic unit, the second magnetic unit, and the third magnetic unit may be thermally connected to each other. For this, an additional heat dissipation unit may be provided between the first magnetic unit and the second magnetic unit and/or between the second magnetic unit and the third magnetic unit. As a result, heat generated in the first magnetic unit and/or the second magnetic unit may be finally transferred to the shield unit more effectively through the additional heat dissipation unit.

The second magnetic unit and the third magnetic unit may be each disposed on the outer part, the central part, or at least a portion thereof of the first magnetic unit. As an example, the second magnetic unit may be disposed on the outer part of the first magnetic unit. As a specific example, the second magnetic unit and the third magnetic unit may be disposed on the outer part. As a result, a high magnetic flux density around the coil can be effectively dispersed, whereby it is possible to increase the charging efficiency as compared with the case in which the first magnetic unit alone is adopted. Alternatively, the second magnetic unit and the third magnetic unit may be disposed over at least a portion of the outer part and the central part.

In addition, the second magnetic unit may be disposed to be coupled to, or separated from, the first magnetic unit.

In addition, the second magnetic unit may be disposed between the shield unit and the first magnetic unit.

As shown in FIG. 8a, the second magnetic unit (500) and the third magnetic unit (700) may be disposed between the shield unit (400) and the first magnetic unit (300), and the heat dissipation unit (810) may be in contact with the third magnetic unit (700) and the shield unit (400) at the same time. As the second magnetic unit and the third magnetic unit each having a magnetic permeability higher than that of the first magnetic unit are disposed close to the shield unit, the high magnetic flux density around the coil can be effectively dispersed, whereby it is possible to not only increase the charging efficiency but also effectively dissipate the heat generation concentrated in the vicinity of the coil of the first magnetic unit as compared with the case in which the first magnetic unit alone is adopted. In addition, here, heat generated in the second magnetic unit may be effectively transferred to the shield unit through the heat dissipation unit. For example, when the second magnetic unit is in the form of a sheet, one side thereof in its entirety may be attached to the shield unit via the heat dissipation unit. Specifically, the third magnetic unit may be attached to one side of the shield unit via the heat dissipation unit.

In addition, an additional heat dissipation unit (820) may be provided between the second magnetic unit (500) and the third magnetic unit (700). As a result, heat generated in the first magnetic unit and/or the second magnetic unit may be finally transferred to the shield unit more effectively through the additional heat dissipation unit.

In addition, a groove may be provided on the surface of the first magnetic unit facing the shield unit, and the second magnetic unit may be inserted into the groove.

As shown in FIG. 8b, the first magnetic unit (300) has a groove on its surface facing the shield unit (400), the second magnetic unit (500) is inserted into the groove, the third magnetic unit (700) is disposed between the shield unit (400) and the second magnetic unit (500), and the heat dissipation unit (810) may in contact with the third magnetic unit (700) and the shield unit (400) at the same time.

In such a case, since the first magnetic unit may serve as a housing of the second magnetic unit, a separate adhesive or structure for fixing the second magnetic unit may not be required. In particular, since the first magnetic unit may be molded into a three-dimensional structure through a mold using a polymer-type magnetic material using a magnetic powder and a binder resin, a groove for inserting the second magnetic unit may be easily formed. In addition, here, heat generated in the third magnetic unit may be effectively transferred to the shield unit through the heat dissipation unit.

The depth of the groove formed in the first magnetic unit may be larger, or smaller, than the thickness (height) of the second magnetic unit.

Alternatively, the depth of the groove formed in the first magnetic unit may be the same as the thickness (height) of the second magnetic unit. In such an event, the third magnetic unit may be in contact with the first magnetic unit and the second magnetic unit.

In addition, the wireless charging device further comprises a heat dissipation unit (820) disposed between the third magnetic unit (700) and the first and second magnetic units (300, 500), wherein the heat dissipation unit (820) is in contact with the first magnetic unit (300), the second magnetic unit (500), and the third magnetic unit (700) at the same time, whereby heat can be transferred more effectively.

Support Unit

As shown in FIG. 5, the wireless charging device (10) may further comprise a support unit (100) for supporting the coil unit (200). The material and structure of the support unit may be a material and structure of a conventional support unit used in a wireless charging device. The support unit may have a flat plate structure or a structure in which a groove is formed in compliance with a coil shape to fix the coil unit.

Housing

As shown in FIGS. 5, 6, and 7a, the wireless charging device (10) according to an embodiment may further comprise a housing (600) for accommodating the components described above.

The housing allows such components as the coil unit, the shield unit, and the magnetic unit to be properly disposed and assembled. The material and structure of the housing may be a material and structure of a conventional housing used in a wireless charging device. It may be appropriately designed according to the components adopted therein.

Spacer

In addition, the wireless charging device according to an embodiment may further comprise a spacer for securing a space between the shield unit and the magnetic unit. The material and structure of the spacer may be a material and structure of a conventional spacer used in a wireless charging device.

Transportation Means

The wireless charging device can be advantageously used in a transportation means such as electric vehicles that require large-capacity power transmission between a transmitter and a receiver.

FIG. 9 shows an electric vehicle, specifically, an electric vehicle provided with a wireless charging device. Since it is provided with a wireless charging device on its lower side, it may be charged wirelessly in a parking area equipped with a wireless charging system for an electric vehicle.

Referring to FIG. 9, the transportation means (1) according to an embodiment comprises a wireless charging device according to the embodiment as a receiver (21). The wireless charging device may serve as a receiver for wireless charging of the transportation means (1) and may receive power from a transmitter (22) for wireless charging.

As described above, the transportation means comprises a wireless charging device, and the wireless charging device has a configuration as described above.

Specifically, the wireless charging device adopted in the transportation means comprises a coil unit; and a first magnetic unit disposed on the coil unit, wherein the first magnetic unit comprises an outer part corresponding to a part where the coil unit is disposed; and a central part surrounded by the outer part, and the outer part has a thickness greater than the thickness of the central part.

The configuration and characteristics of each component of the wireless charging device adopted in the transportation means are as described above.

The transportation means may further comprise a battery for receiving power from the wireless charging device. The wireless charging device may receive power wirelessly and transmit it to the battery, and the battery may supply power to a driving system of the electric vehicle. The battery may be charged by power transmitted from the wireless charging device or other additional wired charging devices.

In addition, the transportation means may further comprise a signal transmitter for transmitting information about the charging to the transmitter of the wireless charging system. The information about such charging may be charging efficiency such as charging speed, charging state, and the like.

The invention claimed is:

1. A wireless charging device, which comprises a coil unit; and a first magnetic unit disposed on the coil unit, wherein the first magnetic unit comprises an outer part corresponding to a part where the coil unit is disposed,; and a central part surrounded by the outer part, and the outer part has a thickness greater than the thickness of the central part, and wherein the wireless charging device further comprises a second magnetic unit disposed on the first magnetic unit and having a magnetic permeability different from that of the first magnetic unit; and a third magnetic unit disposed on the second magnetic unit and having a magnetic permeability different from that of the second magnetic unit.

2. The wireless charging device of claim 1, wherein the first magnetic unit comprises a binder resin and a magnetic powder dispersed in the binder resin.

3. The wireless charging device of claim 1, wherein the first magnetic unit is one molded to a three-dimensional structure through a mold.

4. The wireless charging device of claim 1, wherein the wireless charging device further comprises a shield unit disposed on the first magnetic unit.

5. The wireless charging device of claim 4, wherein at least a portion of the outer part of the first magnetic unit is in contact with the shield unit.

6. The wireless charging device of claim 4, wherein the second magnetic unit and the third magnetic unit are disposed between the first magnetic unit and the shield unit, and the second magnetic unit has a magnetic permeability at 85 kHz higher than that of the first magnetic unit.

7. The wireless charging device of claim 6, wherein the first magnetic unit has a magnetic permeability of 5 to 300 at a frequency of 85 kHz, and the second magnetic unit has a magnetic permeability of 1,000 to 5,000 at a frequency of 85 kHz.

8. The wireless charging device of claim 6, wherein the second magnetic unit is disposed on the outer part of the first magnetic unit.

9. The wireless charging device of claim 6, wherein a groove is provided on the surface of the first magnetic unit facing the shield unit, and the second magnetic unit is inserted into the groove.

10. The wireless charging device of claim 1, wherein the first magnetic unit comprises a magnetic powder and a binder resin, the second magnetic unit comprise a ferrite-based magnetic material, and the third magnetic unit comprises a nanocrystalline magnetic material.

11. The wireless charging device of claim 1, wherein the third magnetic unit has a magnetic permeability higher than those of the first magnetic unit and the second magnetic unit at 85 kHz, and the second magnetic unit has a magnetic permeability higher than that of the first magnetic unit at 85 kHz.

12. The wireless charging device of claim 1, wherein the third magnetic unit is thermally connected to the shield unit.

13. A transportation means, which comprises a wireless charging device, wherein the wireless charging device comprises a coil unit; and a first magnetic unit disposed on the coil unit, the first magnetic unit comprises an outer part corresponding to a part where the coil unit is disposed; and a central part surrounded by the outer part, and the outer part has a thickness greater than the thickness of the central part, wherein the wireless charging device further comprises a second magnetic unit disposed on the first magnetic unit and having a magnetic permeability different from that of the first magnetic unit; and a third magnetic unit disposed on the second magnetic unit and having a magnetic permeability different from that of the second magnetic unit.

* * * * *